(12) United States Patent
Ahn

(10) Patent No.: US 8,999,563 B2
(45) Date of Patent: Apr. 7, 2015

(54) SECONDARY BATTERY

(75) Inventor: Chang-Bum Ahn, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 382 days.

(21) Appl. No.: 13/403,877

(22) Filed: Feb. 23, 2012

(65) Prior Publication Data

US 2012/0258341 A1   Oct. 11, 2012

Related U.S. Application Data

(60) Provisional application No. 61/473,092, filed on Apr. 7, 2011.

(51) Int. Cl.
| H01M 2/08 | (2006.01) |
| H01M 2/34 | (2006.01) |
| H01M 2/02 | (2006.01) |
| H01M 2/12 | (2006.01) |
| H01M 2/04 | (2006.01) |
| H01M 10/42 | (2006.01) |
| H01M 10/0525 | (2010.01) |

(52) U.S. Cl.
CPC .............. H01M 2/021 (2013.01); H01M 2/348 (2013.01); H01M 2/127 (2013.01); H01M 2/0413 (2013.01); H01M 2/0212 (2013.01); H01M 2/0267 (2013.01); H01M 2/0287 (2013.01); H01M 10/0525 (2013.01); H01M 10/4235 (2013.01)

(58) Field of Classification Search
USPC .......................................... 429/163, 171, 453
See application file for complete search history.

(56) References Cited

U.S. PATENT DOCUMENTS

| 7,122,276 | B2 * | 10/2006 | Gu ................................ 429/162 |
| 2003/0118900 | A1 | 6/2003 | Otohata |
| 2004/0029001 | A1 * | 2/2004 | Yamazaki et al. ............ 429/176 |
| 2006/0127760 | A1 | 6/2006 | Hatta et al. |
| 2007/0172739 | A1 * | 7/2007 | Visco et al. .................. 429/322 |
| 2008/0026283 | A1 | 1/2008 | Park et al. |

FOREIGN PATENT DOCUMENTS

| KR | 1020030075889 | 9/2003 |
| KR | 1020060035885 | 4/2006 |
| KR | 1020070008087 | 1/2007 |
| KR | 1020080009510 | 1/2008 |
| KR | 1020080009516 | 1/2008 |

OTHER PUBLICATIONS

Office Action dated May 22, 2012 in corresponding European Patent Application No. 12157373.7.

* cited by examiner

*Primary Examiner* — Jonathan Jelsma
(74) *Attorney, Agent, or Firm* — Knobbe Martens Olson & Bear LLP

(57) ABSTRACT

Disclosed is a battery pack which includes: a battery case comprising a first case member and a second case member, which in combination define an enclosed space, the first case member comprising a first sealing portion, the second case member comprising a second sealing portion, wherein the first and second sealing portions adhere to each other for sealing the enclosed space; an electrode assembly contained in the enclosed space, the electrode assembly comprising a first electrode plate, a second electrode plate, and a separator disposed between the first and second electrode plates; an electrolyte contained in the enclosed space; and a pocket formed in at least one of the first and second sealing portions, wherein the pocket contains an ionic material.

16 Claims, 3 Drawing Sheets

SECONDARY BATTERY

CROSS-REFERENCE TO RELATED APPLICATIONS

This application claims priority to and the benefit of U.S. Provisional Application No. 61/473,092, filed on Apr. 7, 2011, the entire content of which is incorporated herein by reference.

BACKGROUND

1. Field

Embodiments relate to a secondary battery, and more particularly, to a secondary battery having improved safety.

2. Description of the Related Technology

Recently, secondary batteries have been widely used for the power supply of portable electronic equipment and devices. Further, as portable electronic equipment and devices are increasingly used in various fields, there is a rapidly increasing demand for secondary batteries with high capacity. Accordingly, extensive studies are conducted to improve the safety of the secondary battery.

SUMMARY

An aspect of the present invention is to provide a battery pack which includes an explosion prevention part containing ionic materials to improve safety.

According to an aspect of the present invention, a battery pack comprises: a battery case comprising a first case member and a second case member, which in combination define an enclosed space, the first case member comprising a first sealing portion, the second case member comprising a second sealing portion, wherein the first and second sealing portions adhere to each other for sealing the enclosed space; an electrode assembly contained in the enclosed space, the electrode assembly comprising a first electrode plate, a second electrode plate, and a separator disposed between the first and second electrode plates; an electrolyte contained in the enclosed space; and a pocket formed in at least one of the first and second sealing portions, wherein the pocket contains an ionic material.

The ionic material may be configured to react with chemical entities contained in the enclosed space to create an inert atmosphere. The ionic material may also comprise positively charged ions and negatively charged ions, wherein the positively charged ions absorb free electrons contained in the enclosed space, wherein the negatively charged ions react with a positive one of the first and second electrode plates and generate an inert gas.

According to an embodiment, the pocket may be formed by deep drawing.

According to an embodiment, the pocket comprises a recess formed in the first sealing portion, wherein the second sealing portion covers the recess of the first sealing portion.

According to an embodiment, the first sealing portion comprises a first recess, the second sealing portion comprises a second recess, wherein the first and second recesses together define the pocket.

According to an embodiment, the first electrode plate is coupled to a first electrode tab and the second electrode plate is coupled to a second electrode tab, and the first and second electrode tabs extend through the first and second sealing portions, wherein the pocket is formed in a region of the battery case between the first and second electrode tabs. According to an embodiment, the pocket is positioned within a half region closer to the electrode assembly of a region between an edge of the enclosed space and an outer edge of a first sealing part or a second sealing part.

The ionic material may be selected from the group consisting of 1-ethyl-3-methylimidazolium-$(CF_3SO_2)_2N$, 1-buty-3-methylimidazolium-$(CF_3SO_2)_2N$, 1-hexyl-3-methylimidazolium-$(CF_3SO_2)_2N$, 1-ethyl-3-methylimidazolium-$PF_6$, 1-buty-3-methylimidazolium-$PF_6$, 1-ethyl-3-methylimidazolium-$BF_4$, 1-buty-3-methylimidazolium-$BF_4$, 1-hexyl-3-methylimidazolium-$BF_4$, 1-ethyl-3-methylimidazolium-$CF_3SO_3$, 1-buty-3-methylimidazolium-$CF_3SO_3$, and 1-hexyl-3-methylimidazolium-$CF_3SO_3$.

The ionic material may comprise an ionic compound and a solvent.

The solvent may be selected from the group consisting of alcohol, acetonitrile and carbonate.

According to an embodiment, the first and second sealing portions comprise a plurality of layers, wherein the plurality of layers comprises an inner resin layer, an outer resin layer, and a metal layer in between the inner and outer resin layers.

According to an embodiment, the ionic material contacts the inner resin layer, wherein when the secondary battery is overheated, the inner resin layer is configured to melt so as to create a channel between the pocket and the enclosed space such that the ionic material can flow into the enclosed space, thereby contacting chemical entities contained in the enclosed space.

The metal layer may include aluminum.

The inner resin layer or the outer resin layer may include at least one is formed of a non-conducting polymer.

The polymer may be selected from the group consisting of polyethylene, polypropylene, polyacrylate, polyethylene terephthalate, and polyvinylidene fluoride.

According to an embodiment, the secondary battery may further include one or more additional pockets formed between the first and second sealing portions, wherein each of the additional pockets contains an ionic material.

BRIEF DESCRIPTION OF THE DRAWINGS

The accompanying drawings, together with the specification, illustrate embodiments of the present invention, and, together with the description, serve to explain the principles of the present invention.

DETAILED DESCRIPTION

Figure 1:
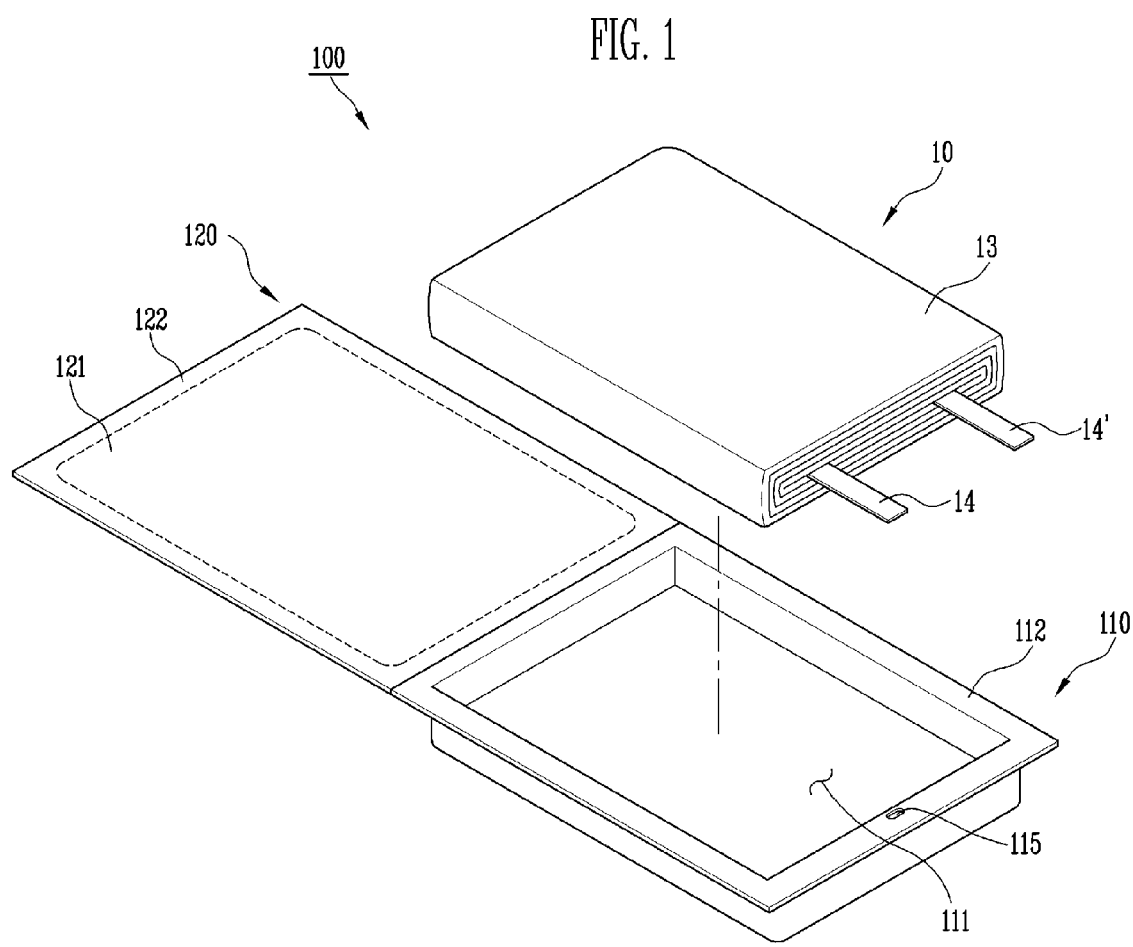
FIG. 1 is an exploded perspective view of a secondary battery according to an embodiment of the present invention.

Reference will now be made in detail to embodiments of the present invention, examples of which are illustrated in the accompanying drawings. The embodiments are described below in order to explain the present invention by referring to the figures. This invention may, however, be embodied in many different forms and should not be construed as limited to the embodiments set forth herein. Rather, these embodiments are provided so that this disclosure is thorough and complete, and will fully convey the scope of the invention to those skilled in the art. It will be understood that when an element or layer is referred to as being "on" or "connected to" another element or layer, the element or layer can be directly on the other element or layer, or the element or layer may be electrically connected to the other element or layer with intervening elements or layers being present. Also, description of unnecessary parts or elements may be omitted for clarity and conciseness, and like reference numerals refer to like elements throughout.

Hereinafter, embodiments of the present invention will be described in detail with reference to the accompanying drawings.

Figure 2:
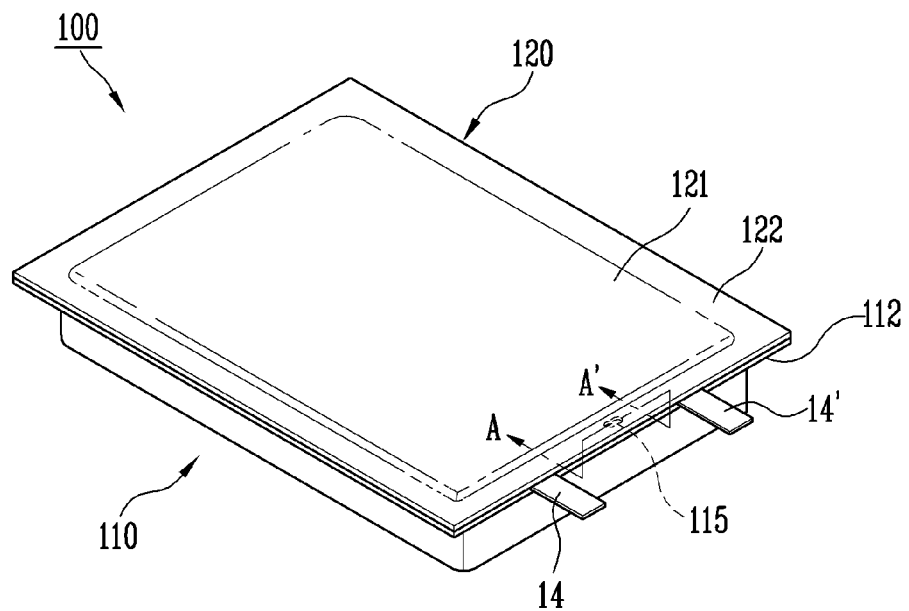
FIG. 2 is a perspective view of a secondary battery according to an embodiment of the present invention.
Figure 3A:
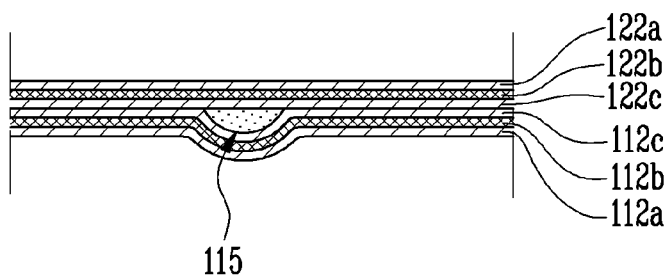
FIG. 3A is a cross-sectional view taken along line A-A' of FIG. 2.
Figure 3B:
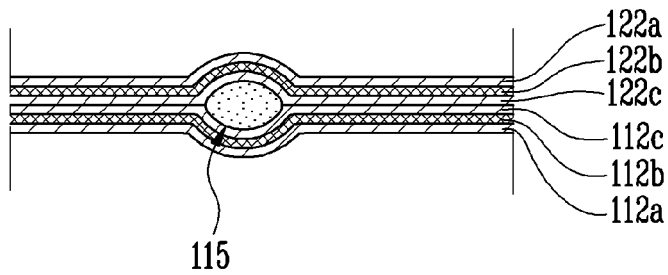
FIG. 3B is a cross-sectional view taken along line A-A' of FIG. 2 according to another embodiment of the present invention.
Figure 4A:
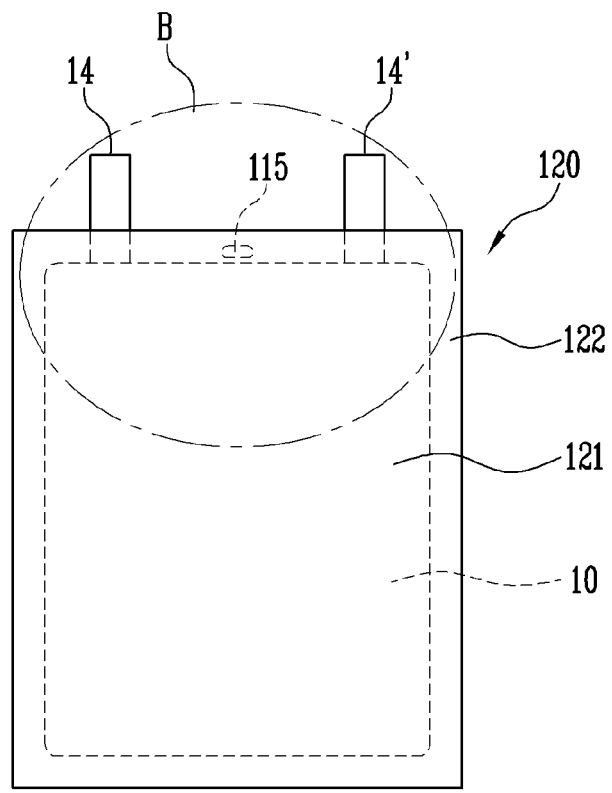
FIG. 4A is a plan view of an upper part of FIG. 2.
Figure 4B:
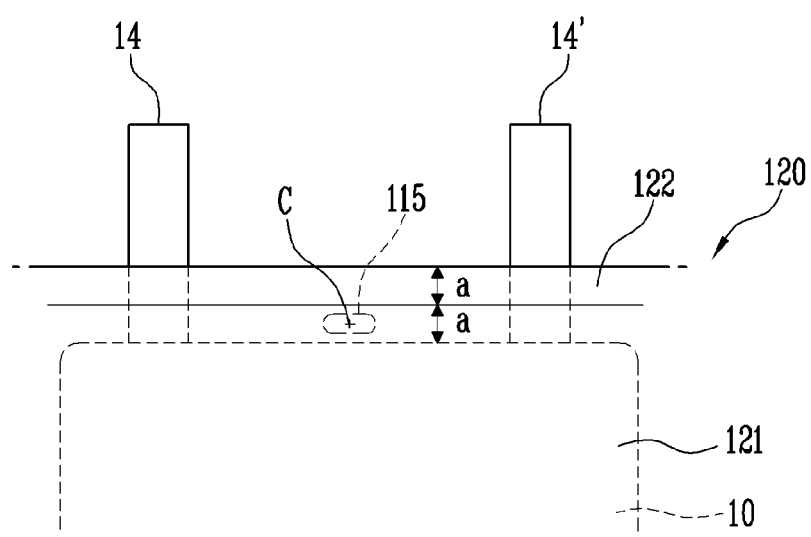
FIG. 4B is an enlarged view of part B of FIG. 4A.

FIG. 1 is an exploded perspective view of a secondary battery according to an embodiment of the present invention; FIG. 2 is a perspective view of a secondary battery according to an embodiment of the present invention; FIG. 3A is a cross-sectional view taken along line A-A' of FIG. 2; FIG. 3B is a cross-sectional view taken along line A-A' of FIG. 2 according to another embodiment of the present invention; FIG. 4A is a plan view of an upper part of FIG. 2; and FIG. 4B is an enlarged view of part B of FIG. 4A.

The secondary battery 100 according to an embodiment of the present invention includes an electrode assembly 10 which includes a first plate having a first electrode tab 14 drawn out, a second plate having a second electrode tab 14' drawn out, and a separator 13 interposed between the first plate and the second plate; and a battery case 110 and 120 which accommodates the electrode assembly 10 and includes an explosion prevention part 115, wherein the explosion prevention part 115 includes an ionic material.

Referring to FIGS. 1 and 2, the secondary battery 10 according to the present embodiment includes the battery case 110 and 120, and the electrode assembly 10 and an electrolyte (not shown) which are accommodated in the battery case 110 and 120.

The electrode assembly 10 may include the first plate, the second plate, and the separator 13 interposed between the plates. The first plate may be referred to as a positive plate, and the second plate may be referred to as a negative plate. Ions or electrons transfer between the first plate and the second plate, generating electrochemical energy.

The first plate may be formed by applying a positive active material to one or both sides of a positive current collector. Generally, the positive current collector may include, not specifically limited, any material which has high conductivity and does not induce chemical changes. Further, the positive active material may include a layered compound including lithium.

The second plate may be formed by applying a negative active material to one or both sides of a negative current collector. The negative current collector may be a conductive metal, and the negative active material may include graphite.

The separator 13 may be interposed between the plates to prevent the plates from being in direct contact with each other so as not to cause a short circuit when the plates have opposite polarities. For example, the separator 13 may be formed of a polymer and use an insulating thin layer having high ion permeability and mechanical strength.

The electrolyte accommodated in the battery case 110 and 120 may include lithium salts functioning as a source of lithium ions and a non-aqueous organic solvent functioning as a medium for transfer of ions involved in an electrochemical reaction. The first plate and the second plate forming the electrode assembly 10 react with the electrolyte to generate electrochemical energy, and the generated electrochemical energy may be transmitted outside the battery case through the first and second electrode tabs 14 and 14'. The electrode assembly 10 of the present embodiment may be manufactured by winding the first plate, the second plate, and the separator 10, but is not limited thereto. The electrode assembly 10 may be manufactured by various methods, e.g., stacking the first plate, the second plate, and the separator.

The battery case 110 and 120 may include a first case 110 and a second case 120, and the explosion prevention part 115 may be provided in at least one of the first case 110 and the second case 120. Here, the first case 110 may be a main body having an accommodating part 111 accommodating the electrode assembly 10, and the second case 120 may be a cover including a cover part 121 corresponding to the accommodating part 111 and covering the main body of the battery case. Further, the battery case 110 and 120 may be, without being limited to, a pouch.

The first case 110 may include a first sealing part 112 extending from the accommodating part 111 on an edge, and the second case may include a second sealing part 122 corresponding to the first sealing part 112. The secondary battery 100 of the present embodiment may be manufactured by accommodating the electrode assembly 10 and the electrolyte in the accommodating part 111 of the first case 110, and then thermally fusing the first sealing part 112 and the second sealing part 122 while the first case 110 and the second case 120 adhere to each other.

Meanwhile, the first plate and the second plate of the electrode assembly 10 may include the first electrode tab 14 and the second electrode tab 14', respectively, which are formed of an electric conductor. The first electrode tab 14 and the second electrode tab 14' are formed to protrude to the outside through the first sealing part 112 and the second sealing part 122 which are thermally fused and function to electrically connect the secondary battery 100 to outside the battery case.

The accommodating part 111 may be formed corresponding to a shape of the electrode assembly 10. Here, the accommodating part 111 may be formed by deep drawing, which is used to manufacture a seamless hollow container from a plate. Likewise, the explosion prevention part 115 may also be formed by deep drawing.

Referring to FIGS. 3A and 3B, the explosion prevention part 115 may be formed in a concave shape by deep drawing. The explosion prevention part 115 may be provided as a pocket, a cavity or hollow formed in the first sealing part 112, in the second sealing part 122, or in both first and second sealing parts 112 and 122.

The explosion prevention part 115 may also accommodate an ionic material. The ionic material may include at least one selected from the group consisting of $EMI-(CF_3SO_2)_2N$, $BMI-(CF_3SO_2)_2N$, $HMI-(CF_3SO_2)_2N$, $EMI-PF_6$, $BMI-PF_6$, $EMI-BF_4$, $BMI-BF_4$, $EMI-CF_3SO_3$, $BMI-CF_3SO_3$, and $HMI-CF_3SO_3$, but is not limited thereto. Further, the ionic material which reacts with electrons may be a polyvalent material, but any ionic material which extracts metal and generates gas via an electrochemical reaction may be used for the ionic material. This is because in the electrochemical reaction, the polyvalent ionic material relatively actively participates in oxidation and reduction reactions, contributing to improvement in safety of the secondary battery 100. Here, EMI represents 1-ethyl-3-methylimidazolium, BMI represents 1-buty-3-methylimidazolium, and HMI represents 1-hexyl-3-methylimidazolium.

Here, the ionic material refers to ionic salts or compounds thereof which exist in a liquid state at 100° C. or less. The ionic material receives attention as a new medium due to unique chemical, physical, and electrical properties, e.g., low volatility, non-flammability, stability in a liquid state at high temperature, high solvation ability with respect to organic and inorganic materials, and high electrical conductivity. Particularly, properties of the ionic material may be changed by various combinations of cations and anions depending on purposes.

Here, a solvent dissolving the ionic material may include, without being limited to, water, alcohol, acetonitrile, carbonate, or the like. For example, a solvent may be selected from the group consisting of isopropyl alcohol, acetone, ethyl methyl carbonate, or the like. These materials may be used alone or as a mixture of at least two kinds. In addition, a used amount of the solvent is not specifically limited, but may be less than an amount in which a saturated solution of the ionic compound is made.

The first case 110 and the second case 120 may be formed of a plurality of layers including an inner resin layer 112c and 122c, a metal layer 112b and 122b, and an outer resin layer. The inner resin layer 112c and 122c directly faces the electrode assembly 10, and the outer resin layer 112a and 122a faces the outside. The inner resin layer 112c and 122c or the outer resin layer 112a and 122a may be formed of a polymer that is a nonconductor of electricity in order to prevent a short circuit of the secondary battery. The metal layer 112b and 122b may be disposed between the inner resin layer 112c and 122c and the outer resin layer 112a and 122a and improve mechanical strength of the first case 110 and the second case 120. The metal layer 112b and 122b may include, for example, aluminum.

Here, the polymer included in the inner resin layer 112c and 122c or the outer resin layer 112a and 122a may include at least one selected from the group consisting of polyethylene, polypropylene, polyacrylate, polyethylene terephthalate, and polyvinylidene fluoride, but any polymer which is melted at a temperature higher than a normal operation temperature of the secondary battery 100, or at a voltage higher than a normal operation voltage, may be used.

The explosion prevention part 115 of the present embodiment does not influence the secondary battery 100 when inside temperature and voltage of the secondary battery 100 are normal. However, when the inside temperature is abnormally high or an overvoltage state occurs due to overcharging, a portion of the inner resin layer 112c and 122c or the outer resin layer 112a and 122a including the polymer, which is adjacent to the explosion prevention part 115, may melt. When a portion of the explosion prevention part 115 melts, an inside of the explosion prevention part 115 becomes exposed to the outside. Here, the ionic material accommodated in a concave space in the explosion prevention part 115 is discharged to the outside.

As a result that an electron of the ionic compound reacts with an electron of the positive active material, the resultant reaction product is absorbed with the surface of the positive active material. That is to say, the resultant reaction product is blocked out the reaction site of the positive active material. Accordingly, explosion of the secondary battery 100 by abnormally high temperature or overvoltage may be avoided.

Referring to FIGS. 4A and 4B, a center c of the explosion prevention part 115 may be positioned between the first electrode tab 14 and the second electrode tab 14'. The first plate that is the positive plate and the second plate that is the negative plate, constituting the electrode assembly 10, react with the electrolyte to generate electrochemical energy, and the generated electrochemical energy may be transmitted to the outside through the first and second electrode tabs 14 and 14'. In this structure of the secondary battery 100, when external impact occurs, the inside temperature becomes abnormally high, or an overvoltage state occurs, a portion between the first electrode tab 14 and the second electrode tab 14' may be overheated the most easily. Thus, the center of c of the explosion prevention part 115 may be positioned in a region in which abnormally high temperature or an overvoltage state due to overcharging is properly detected, and the inner resin layer 112c and 122c or the outer resin layer 112a and 122a adjacent to the explosion prevention part 115 is quickly melted, coping with the abnormally high temperature or the overvoltage state, and generates the ionic material.

Further, the center c of the explosion prevention part 115 may be positioned within a half region closer to the electrode assembly 10 of a region between an edge of the accommodating part and an outer edge of the first sealing part 112 or the second sealing part 122. The ionic material accommodated in the explosion prevention part 115 is discharged, the inner resin layer 112c and 122c or the outer resin layer 112a and 122a adjacent to the explosion prevention part 115 being melted, when external impact occurs, the inside temperature becomes abnormally high, or an overvoltage state occurs due to overcharging. Here, when the explosion prevention part 115 is positioned close to the outer edge of the first sealing part 112 or the second sealing part 122 which is far from the electrode assembly 10, the ionic material may be discharged out of the first and second cases 110 and 120. However, when the explosion prevention part 115 is positioned close to the electrode assembly 10, the ionic material may not be discharged out of the first and second cases 110 and 120 but be discharged to the electrode assembly 10.

Meanwhile, the electrolyte of the secondary battery generally includes additives for safety purpose, and a greater amount of additives is added in a medium or large size of the secondary battery. However, in the secondary battery having the explosion prevention part including the ionic material according to the present embodiment, the safety of the secondary battery may be ensured even though the electrolyte includes a great amount of additives.

As described above, according to the present embodiment, a secondary battery includes an explosion prevention part including an ionic material to have improved safety without a large amount of additives. Further, a secondary battery case according to an embodiment includes a resin layer having a low melting point, so that property safety is improved when swelling occurs due to high temperature and a short circuit.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
  a battery case comprising a first case member and a second case member, which in combination define an enclosed space, the first case member comprising a first sealing portion, the second case member comprising a second sealing portion, wherein the first and second sealing portions adhere to each other for sealing the enclosed space and wherein the first and second sealing portions each comprise an inner resin layer;
  an electrode assembly contained in the enclosed space, the electrode assembly comprising a first electrode plate, a second electrode plate, and a separator disposed between the first and second electrode plates;
  an electrolyte contained in the enclosed space; and
  a pocket formed in at least one of the first and second sealing portions, wherein the pocket contains an ionic material and the pocket further comprises a recess formed in the first sealing portion, wherein the second sealing portion covers the recess of the first sealing portion, and wherein when the battery pack is overheated, the inner resin layer melts, and the ionic material contacts the inner resin layer and flows into the enclosed space through a channel formed between the pocket and the enclosed space, thereby contacting chemical entities contained in the enclosed space.

2. The secondary battery of claim 1, wherein the pocket is formed by deep drawing.

3. The secondary battery of claim 1, wherein the first sealing portion comprises a first recess, the second sealing portion comprises a second recess, wherein the first and second recesses together define the pocket.

4. The secondary battery of claim 1, wherein the first electrode plate is coupled to a first electrode tab and the second electrode plate is coupled to a second electrode tab, and the first and second electrode tabs extend through the first and second sealing portions, wherein the pocket is formed in a region of the battery case between the first and second electrode tabs.

5. The secondary battery of claim 1, wherein the ionic material is selected from the group consisting of 1-ethyl-3-methylimidazolium-$(CF_3SO_2)_2N$, 1-buty-3-methylimidazolium-$(CF_3SO_2)_2N$, 1-hexyl-3-methylimidazolium-$(CF_3SO_2)_2N$, 1-ethyl-3-methylimidazolium-$PF_6$, 1-buty-3-methylimidazolium-$PF_6$, 1-ethyl-3-methylimidazolium-$BF_4$, 1-buty-3-methylimidazolium-$BF_4$, 1-hexyl-3-methylimidazolium-$BF_4$, 1-ethyl-3-methylimidazolium-$CF_3SO_3$, 1-buty-3-methylimidazolium-$CF_3SO_3$, and 1-hexyl-3-methylimidazolium-$CF_3SO_3$.

6. The secondary battery of claim 1, wherein the ionic material comprises an ionic compound and a solvent.

7. The secondary battery of claim 6, wherein the solvent is selected from the group consisting of water, alcohol, acetonitrile and carbonate.

8. The secondary battery of claim 1, wherein the first and second sealing portions comprise a plurality of layers.

9. The secondary battery of claim 8, wherein the plurality of layers comprises the inner resin layer, an outer resin layer, and a metal layer in between the inner and outer resin layers.

10. The secondary battery of claim 9, wherein the metal layer comprises aluminum.

11. The secondary battery of claim 9, wherein the inner resin layer or the outer resin layer is formed of a non-conducting polymer.

12. The secondary battery of claim 11, wherein the polymer is selected from the group consisting of polyethylene, polypropylene, polyacrylate, polyethylene terephthalate and polyvinylidene fluoride.

13. The secondary battery of claim 1, further comprising one or more additional pockets formed in at least one of the first and second sealing portions, wherein each of the additional pockets contains an ionic material.

14. The secondary battery of claim 1, wherein the pocket is positioned relatively closer to an edge of the first and second sealing portions adjacent to the enclosed space than to an edge of the first and second sealing portions adjacent to an exterior of the battery case.

15. The secondary battery of claim 1, wherein the sealing portions comprise a width formed by a first half width and a second half width, and the first half width is formed by an edge adjacent to the enclosed space and a midpoint of the width, and the second half width is formed by an edge adjacent to the exterior of the battery case and the midpoint of the width, and the pocket is positioned within the first half width.

16. The secondary battery of claim 4, wherein the pocket is positioned relatively closer to an edge of the first and second sealing portions adjacent to the enclosed space than to an edge of the first and second sealing portions adjacent to an exterior of the battery case.

* * * * *

UNITED STATES PATENT AND TRADEMARK OFFICE
CERTIFICATE OF CORRECTION

| | |
|---|---|
| PATENT NO. | : 8,999,563 B2 |
| APPLICATION NO. | : 13/403877 |
| DATED | : April 7, 2015 |
| INVENTOR(S) | : Chang-Bum Ahn |

It is certified that error appears in the above-identified patent and that said Letters Patent is hereby corrected as shown below:

IN THE SPECIFICATION

At column 2, line 5, please delete "1-buty-" and insert -- 1-butyl- --, therefor.

At column 2, line 8, please delete "1-buty-" and insert -- 1-butyl- --, therefor.

At column 2, line 9, please delete "1-buty-" and insert -- 1-butyl- --, therefor.

At column 2, line 11, please delete "1-buty-" and insert -- 1-butyl- --, therefor.

At column 4, line 60, please delete "1-buty-" and insert -- 1-butyl- --, therefor.

IN THE CLAIMS

At column 7, line 25, please delete "1-buty-" and insert -- 1-butyl- --, therefor.

At column 7, line 27, please delete "1-buty-" and insert -- 1-butyl- --, therefor.

At column 7, line 29, please delete "1-buty-" and insert -- 1-butyl- --, therefor.

At column 7, line 30, please delete "1-buty-" and insert -- 1-butyl- --, therefor.

Signed and Sealed this
Twenty-third Day of February, 2016

Michelle K. Lee
*Director of the United States Patent and Trademark Office*